United States Patent
Hoberg et al.

(12)

(10) Patent No.: US 6,216,967 B1
(45) Date of Patent: Apr. 17, 2001

(54) PROCESS FOR DISAGGREGATING WASTE MATERIALS WHICH CONTAIN AT LEAST PARTIALLY REUSABLE ELEMENTS

(75) Inventors: Heinz Hoberg; Joachim Christiani; Michael Langen; Martin Bender, all of Aachen (DE)

(73) Assignee: Der Gruene Punkt-Duales System Deutschland Aktiengesellschaft, Cologne (DE)

(*) Notice: Subject to any disclaimer, the term of this patent is extended or adjusted under 35 U.S.C. 154(b) by 0 days.

(21) Appl. No.: 09/284,944
(22) PCT Filed: Oct. 24, 1997
(86) PCT No.: PCT/EP97/05896
  § 371 Date: Jun. 1, 1999
  § 102(e) Date: Jun. 1, 1999
(87) PCT Pub. No.: WO98/18607
  PCT Pub. Date: May 7, 1998

(30) Foreign Application Priority Data
Oct. 25, 1996 (DE) .............................. 196 44 437

(51) Int. Cl.[7] ....................................... B02C 1/00
(52) U.S. Cl. ................. 241/21; 241/24.14; 241/24.15; 241/24.18; 241/24.19; 241/46.17
(58) Field of Search ........................... 241/21, 29, 24.13, 241/24.14, 24.15, 24.18, 24.19, 46.17

(56) References Cited

FOREIGN PATENT DOCUMENTS

0570757 * 11/1993 (EP) .

* cited by examiner

*Primary Examiner*—Mark Rosenbaum
(74) *Attorney, Agent, or Firm*—Oblon, Spivak, McClelland, Maier & Neustadt, P.C.

(57) ABSTRACT

A process is disclosed for disaggregating waste materials which contain at least partially reusable elements, mainly metals, plastics and cardboard. The waste materials are stirred in water by mechanical forces, large pieces, in particular plastic pieces, are coarsely crushed and soluble elements, in particular cardboard, are dissolved. The metallic elements are separated from the suspension as heavy materials, the remaining coarse solids, in particular plastics, are mechanically separated from the suspension, and the suspended fine solids are separated from the suspension by dewatering.

17 Claims, 2 Drawing Sheets

PROCESS FOR DISAGGREGATING WASTE MATERIALS WHICH CONTAIN AT LEAST PARTIALLY REUSABLE ELEMENTS

In the disposal of waste, a practice has been implemented successfully in the course of the years, whereby the refuse produced by commerce, industry and households is pre-sorted immediately at source. This pre-sorting essentially involves five categories, i.e. glass, paper, non-recycable tailings, organic wastes and waste matter which has reusable components. The waste matter which has reusable components is formed, predominantly, by packaging waste and essentially comprises a wide range of different plastics materials and composite material, essentially comprising cardboard and paper board which are lined with plastics foils and/or metal foils, as well as metal cans. To date, the reusable components in these wastes were separated on sorting belts, with the components recognized as being reusable, such as, for example, metal packaging, hollow plastics containers, substantial balls of foil and the like, being picked out. The degree of recovery of reusable materials in a hand-sorting operation is, of course, relatively small since it is, in practice, possible to pick out only those components which are readily grasped by a gloved hand.

The object underlying the invention is to provide a process which permits a higher degree of reclamation during the treatment of such waste matter and results in an improved recovery of the reusable components.

According to the invention, this object is met by a process for the treatment of waste matter which contains components which are at least partially reusable, essentially being metals, plastics materials and board, in which process the waste matter to be treated is agitated in water, with the application of mechanical force, whereby large parts, essentially being parts of plastics material, are coarsely reduced in size and soluble components, essentially being cardboard and paper board, are dissolved, and in which process the metal components, as heavy matter, and the remaining solids, essentially being plastics materials, are mechanically separated from the suspension, and the suspended fine solids are separated by draining.

The term "waste matter" in this regard includes not only the waste matter in the composition as at delivery, but also in its composition after pre-sorting.

The process according to the invention permits a very much higher degree of recovery of reusable materials than would ever be possible with a hand-sorting operation. As a result of the agitation in water, cardboard and paper board lined with plastics foils and/or metal foils are separated such that, with an appropriate residence time, the board component is dissolved and is suspended as fibrous material. As a result of the exposure to force in the water bath, large-sized packaging; comprising the above-mentioned composite material, but also large hollow bodies of plastics material, such as detergent and cosmetics bottles as well as beverage cans of aluminium, are broken up.

As a result of the exposure to force in the water bath, it is, on the other hand, ensured that these parts are subjected only to a coarse reduction in size, for example, down to a size of 300 mm. In this regard, it is advantageous when the reduction in size in the water takes place in a shearing-cutting manner. In this regard, the only coarse reduction in size has the advantage that it is possible for the subsequent separation of the coarse solid components from the suspension, and any possible subsequent processing steps, to be carried out more conveniently. Depending on the composition of the matter treated, it is then possible for the separated coarse solids either to be used directly or, if called for by the subsequent recycling operation, to be processed accordingly in subsequent sorting steps. As far as the fine solids separated from the suspension are concerned, a factor for consideration is also the degree to which fibrous materials are dissolved in the remaining suspension, because it is then also possible for said fibrous materials to be separated in a subsequent step from the non-recyclable fines, such as sand, dust, organic impurities or the like. As a result of the preferably shearing-cutting force, metal components, in the form of beverage cans or the like, in the matter treated are also coarsely reduced in size to a certain degree. Depending on the agitation method used, it is possible for these metal components, due to their density, to sink to the bottom of the apparatus used in this regard, and to be withdrawn from the bottom together with other heavy components, forming the heavy matter. It is possible to make allowance for changing compositions of the waste matter, by changing the energy supply for producing the force.

Whereas it is necessary, in order to sort waste matter on a sorting belt, for the quantities of waste matter to be supplied, if at all possible, in bulk form and without compacting, the process according to the invention has the advantage that it is also possible for such quantities of waste matter to be compacted to a certain extent, because, when introduced into the water, all lumps and clusters are reliably broken up by the action of the force. Compacting must, however, not be intense to the extent where, for example, metal cans are compressed completely with other refuse components disposed within said cans being firmly enclosed therein.

Since the composition is dependent, to a certain degree, on the type of refuse collection, it may be expedient to provide presorting steps which then result in a simplification of the main process.

An advantageous development of the invention provides that the coarse solids, essentially comprising the plastics components, be rinsed with clean water when separated from the suspension. It is possible for this procedure to be carried out, for example, in a screening procedure during which the coarse solids retained are sprayed with clean water. It may be advantageous, in this regard, when the separating or already separated solids are rearranged under the effect of force, at the same time as clean water is admitted. In this regard, it is possible for the rearranging to be carried out by purely mechanical means, for example by placing the matter on to a drum screen, and/or by spraying with water under pressure, the action of force of the water resulting in a rearranging of the solids. It is, however, also possible for the solids separated out of the suspension to be placed separately in a water bath, in order to loosen up the solids under agitation and for rinsing said solids.

Since, as set out above, the coarse solids essentially comprise plastics components which, however, in practice includes mixtures of all conventional types of synthetic materials, for example polyolefin-based plastics, vinyl chloride plastics, polycarbonate plastics, polystyrenes and polyethylene terephthalate, it is expedient, according to a further development of the invention, at this stage to carry out at least one sorting procedure in respect of different plastics materials, since a heterogeneous plastics mixture of this kind is virtually not reusable and not suitable for further processing. In this regard, it is advantageous when the coarse solids are separated in a gravimetric floatation separation process, according to their density, into at least two fractions. In this regard, it is particularly advantageous when the gravimetric floatation separation is adjusted such that it is possible for polyolefin plastics to be separated as the floating matter. This procedure advantageously uses the fact that the difference in density between polyolef in plastics, on the one hand, and the other types of plastics material mentioned above is so distinct that a practically 100% separation of the polyolefin plastics and the bulk of the other types of plastic materials is possible, with the result that it is possible for the floating matter to be separated from the waste matter in the form of a readily reusable valuable material. In comparison to a sorting belt, which allows only for coarse-shaped refuse components, which are identifiable by the sorting personnel as polyolefin plastics products, to be sorted out of the charged matter, the process according to the invention makes it possible to separate virtually the entire polyolefin plastics component from the charged matter. In order to increase the selectivity between the two groups to be separated, it is expedient when the gravimetric floatation separation is carried out in a centrifugal field.

Depending on the separation process used for the fractions of plastics materials contained in the solids, it may be expedient when the coarse solids are subjected to a further reduction in size prior to being admitted to the gravimetric floatation separation process. In the basic breakdown by agitation in the suspension, a reduction in size of the large parts to a size of the individual item down to about $\geq 300$ mm is possible. Depending on the type of gravimetric floatation separation used, it is, however, possible that this size of the individual items is still too large, especially for a gravimetric floatation separation in a centrifugal field, such that it is expedient to carry out a further reduction in size during which the coarse solids are reduced to a size of about $\leq 30$ mm or, in a further comminuting step, to a size of about $\leq 5$ mm. In this regard, the comminution is advantageously carried out by a cutting comminution.

An embodiment of the invention provides that the heavy matter collected during the basic treatment and/or the deposited matter collected in the gravimetric floatation separation, which matter, in each case, contains non-magnetic metal components, essentially being aluminium, is exposed to an eddy current field, such that the non-magnetic metal components are thrown out from the remaining deposited matter, under the effect of the electromagnetic field building up. In this regard, it may be expedient when the metal components separated off are subsequently subjected to a rinsing operation.

Depending on the composition and/or depending on whether it is possible for the remaining matter withdrawn from the eddy current field to be recycled further, this matter is either disposed of, for example, by removing it within the framework of refuse incineration, or to be broken down into further groups, in the event of a high plastics content, as a mixed plastics material. This mixed plastics material collected in the eddy current-type separator essentially comprises the synthetic materials polycarbonate, polystyrene and polyethylene terephthalate, as well as polyvinyl chloride. When the polyvinyl chloride is withdrawn from this mixed plastics material, because it has a an adverse effect on the chemical treatment of this remaining fraction, it is then possible for this remaining plastics component to be recycled further within the framework of a chemical processing treatment. In this regard, it is expedient, in further development of the process according to the invention, that the deposited matter, from which the metal components have been removed, is loosened up in a fluidized bed for conditioning, and the PVC component is subsequently substantially separated out in an electrostatic free-fall separator.

Depending on whether further treatment is possible, it is then possible for the PVC-free deposited matter to be used as a plastics raw material for further processing within the framework of chemical processing or within the framework of conversion processes. Depending on the respective recycling means, it may be expedient when the PVC-free deposited matter is separated into at least two fractions in a further density-based separating process, for example in a cyclone or in a centrifuge. In this separating process, it is then possible, for example, to separate the polystyrenes, while the remaining plastics materials are then disposed of or incinerated as residual matter. It is also possible, for separating the polystyrenes, to conduct the density-based separating process prior to the PVC separation.

The core process step of the invention resides in that the matter treated is agitated in water with mechanical intervention, thereby providing a breakdown which makes it possible to separate heavy matter, essentially containing metal components, coarse solids, essentially comprising plastics material, and fine solids suspended in the water, which fine solids essentially comprise fibrous material, whereby the coarse solids, when cleaned, are in the form of mixed plastics material and, depending on the objective, are either further processed in the mixture or, as the separate process steps set out above indicate, are broken down still further.

It is possible for the main step of the process according to the invention to be carried out in various ways. A development of the invention provides that the breakdown of the matter to be treated is carried out in batches by agitation in a water bath, the duration of agitation being determined according to the degree of breakdown. In this process, it is possible to make allowance for the fact that the composition of the matter to be treated is likely to vary greatly, depending on its source. It is indeed possible that, at different times, charges are supplied which, for the greater part, contain nothing other than plastics packaging, with only very few board/foil packaging materials. In a charge of this kind, only a short agitation time is required, such that it is possible for the solids to be separated from the suspension after a short period of agitation. On the other hand, it is also possible that charges which predominantly comprise board/foil packaging materials, are supplied. Charges of this kind require a relatively long agitation time in order, on the one hand, to bring about a reliable separation of the foil from the board layer and a breakdown of the board to form a fibre mash.

A further development of the invention provides that the breakdown of the matter to be treated is carried out in batches by agitation in at least two water baths which follow each other, either spatially or chronologically. When proceeding in this manner and when the water baths are spatially separated, it is possible for the matter to be treated to be supplied continuously, the breakdown being brought about in a corresponding number of water baths. In this regard, it is desirable that, in the first water bath, initially only a first reduction in size takes place, and the fibre breakdown takes place, also under agitation, in the following water bath. The objective in this process is to remove the main dirt content with the first washing water. The fibrous materials are suspended in the second water bath. When proceeding in this manner, the fibrous materials are virtually free of organic pollutants.

Another development of the invention provides that the breakdown by agitation in water of the matter to be treated is carried out continuously in a through-flow. A treatment of this kind is particularly expedient when, on the one hand, large quantities of refuse are available, the refuse supplied by the collection points being rendered homogeneous up to a certain degree in an upstream mixing stage, optionally prior to being charged into the breakdown stage.

As stated above, it may be advantageous, depending on the composition, for the refuse supplied to be broken down by way of preparation in a preliminary step. In a development of the invention, it may, in this regard, be expedient when ferromagnetic components are removed from the matter to be treated by magnetic separation prior to and/or after the breakdown by means of water. Said ferromagnetic components essentially include tin plate packaging, the mass ratio of which may amount up to 30% in the refuse supplied. As a result of the prior separation from the matter to be treated, the subsequent wet breakdown process is considerably simplified.

Depending on the quality and composition of the waste matter, it may be expedient, according to a development of the process according to the invention, for the matter to be treated to be subjected to a dry separation process prior to being broken down with water. As a result hereof, it is possible for a number of material groups, which would interfere with the wet breakdown process, to be removed in a preliminary step from the matter to be broken down subsequently in a wet process. These material groups include fine matter essentially comprising stones, glass, sand, organic waste matter and the like and the foil component included in the plastics components.

In developing the process according to the invention, it is expedient in this regard for the sorting separation to be carried out in at least a single step by screening and/or air separation, and essentially for only those parts of the groups obtained by separation which are to be broken down by means of water to be added to water for breaking down.

In addition to a sorting separation by means of screening and/or air separation, and within the concept of a dry preliminary process, it is also possible for specific components to be separated systematically from the waste matter, for example beverage cartons and/or PET bottles. A systematic separation of this kind is possible when using a so-called auto-sort system, whereby the components to be eliminated from the loosened continuously advancing waste matter are identified via infrared measuring, and are then automatically eliminated, for example, by means of compressed air. It is possible for an auto-sort apparatus of this kind to be designed to comprise multiple steps such that it is possible, for example, for beverage cartons first and then the above-mentioned PET bottles to be eliminated. The remaining portion is then directed to the wet breakdown process.

The invention will be described in more detail, by way of example, with reference to flow charts in which.

Figure 1:
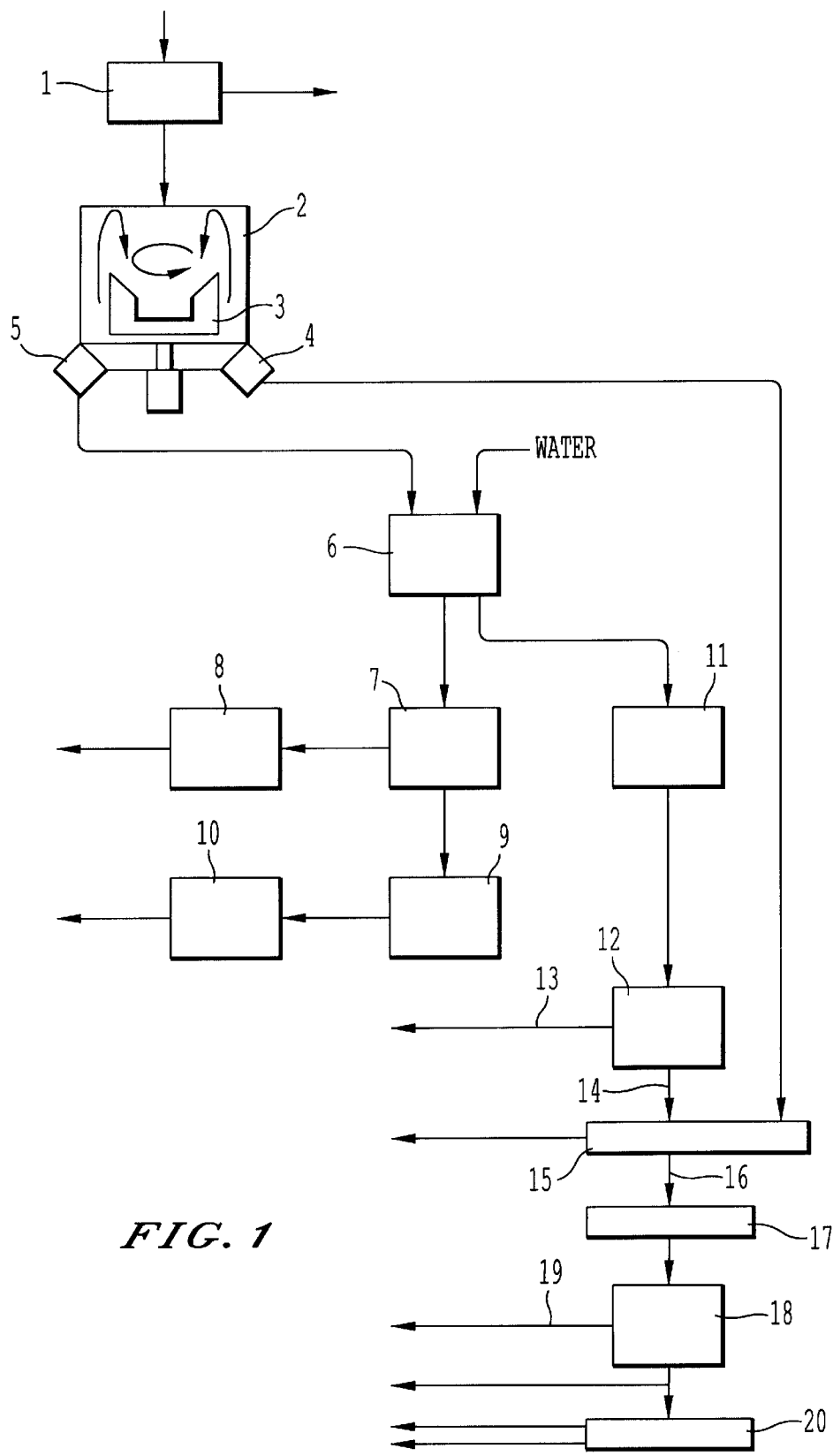
FIG. 1 shows the basic process.

The exemplified embodiment in respect of the basic process as illustrated by the flow chart of FIG. 1 and described in more detail hereinafter has been designed with the objective that, if at all possible, all the reusable components in the matter to be treated be separated from one another and be directed for recycling. Depending on prevailing factors, it is possible for the breakdown process to be "interrupted" at predetermined points along the flow chart.

The matter to be broken down comprises waste matter, which contains components which are, at least partially, reusable, essentially being metals, plastics material and board, in particular foil-coated board, and which is supplied, for example during waste disposal, in the so-called "yellow bins" or "yellow bags", and which is also produced in loose form in the stations for sorting this material. When the supply is mainly by way of bags, the first step involves tearing open the bags, while this does not constitute a step in the process. Although this is not actually essential, as will be explained hereinafter, it is advantageous.

The waste matter, which is supplied in a more or less densely packed bed, is first directed across a magnetic separator 1 in which ferromagnetic parts are substantially removed from the matter to be treated. The core concept of the process is a so-called wet step for breaking down the waste matter. The waste matter from the magnetic separator 1 or from a preceding dry separation process are, in each case, charged in predetermined charge quantities into a water bath, formed by a container 2. In the bottom region of the container 2, a motor-driven rotating agitator 3 is provided and this exerts a corresponding force on the content of the container. As a result of the action of the force, on the one hand, the liquid part is stirred in the manner of a toroidal flow stream, thereby dragging along the solid components of all kinds, i.e. not only the plastics materials, but also the other heavy components and, in particular, the non-ferrous metal components, repeatedly enter the sphere of influence of the agitator. In so doing, any relatively large solid components, for example plastic bottles, aluminium cans or composite board/foil beverage packaging, are broken up mechanically, such that they have a maximum size of about 300 mm, depending on the duration of the treatment. The paper and board components, in particular the composite board/foil packaging, are, on the one hand, completely separated from each other, due to the constant circulation in the water bath and, on the other hand, the board component and other paper and board components in the matter to be treated, are dissolved to form fibres. The operating period of the agitator is determined according to the degree of breakdown sought, and it is possible for this to be assessed visually, with some experience, by the colour of the suspension as it forms. At least after completion of the agitation procedure, the heavy materials contained in the treated matter and, in particular, the non-ferromagnetic metal components, for the greater part sink to the bottom of the container 2, whence they are designed to be withdrawn separately via a corresponding discharge gate 4. The suspension is drained from the container 2 via a discharge valve 5 and is directed to a separating means 6.

Since the matter to be treated is supplied to the container 2 in batches, it is possible to conduct a preliminary optical control of the basic composition. If such a control were to reveal that the charged matter to be treated contained, for example, plastics components heavily coated with food remnants, for example yoghurt cups or the like, it is possible for the charged matter to be stirred in the water bath via the agitator 3 with only a minimal force, thereby washing said matter, but without a reduction in size taking place at this stage. The washing water is then drained off via the discharge valve and is taken for treatment of the water. Thereupon, the container is again filled with water, such that it is then possible for the previously described procedure to be carried out. If it were to be established that the charged matter contains very many sealed plastics containers, for example bottles and/or canisters, then the container 2 is first filled only with water and the agitator 3 is briefly operated at a high speed, such that a greater force is provided for breaking open the plastics containers. Subsequently, the agitator 3 continues to operate at a normal speed.

In the separating means 6, which is, for example, at least one drum screen, the coarsely crushed solids, which are essentially plastics parts, are separated from the remaining suspension.

It is subsequently possible for the suspension, depending on the materials which it contains, to be drained and to be disposed of or incinerated in the form of a sludge.

When the board component is, however, substantial, it is expedient when the suspension is first directed via a fibre separating means 7, for example a tumbling screen or a curved screen, in which the fibrous component is separated from the remaining solid components. It is then possible for the fibrous component to be drained by means of a press 8 and to be directed, as a valuable material, to the production of board or paper. The remaining suspension collected in the fibre separating means 7 is then drained and is withdrawn in the form of sludge. It is possible for the draining operation to be a single-stage or a double-stage operation, as illustrated herein, via a decker 9 and a decanter 10.

Since the most important factor in the process is that the plastics materials be recovered from the waste matter in the purest possible form, any quantities of suspension still adhering after the separation from the suspension are rinsed off in the separating means 6, using clean water, such that it is possible for the mixed plastics material collected to be as clean as possible when directed for further processing. Since the plastics parts are predominantly in the form of flat particles, due to the reduction in size, and are therefore disposed in layers one on top of the other, a rearranging is carried out in the separating means, and this may be carried out mechanically, for example by using a drum screen and/or by introducing compressed water, such that it is possible to ensure a substantial rinsing of any adhering suspension as a result of the impact of the jet forces of the rinsing water introduced, optionally in conjunction with the mechanical forces.

Depending on the recycling options available, it is now possible for the mixed plastics material thus cleaned and withdrawn from the separating means 6 to be directed immediately to a recycling step.

In view of the fact that the mixed plastics material collected is, however, very heterogeneous in its specific composition, it may be expedient, with a view to a more thorough and more extensive recycling, for this mixed plastics material to be separated into two further groups, the separation of the polyolefin plastics from this mixed plastics material being of particular interest.

Depending on the separating process used, it may now be expedient for the plastics parts, which are collected from the separating means 6 in a relatively coarse form, to be comminuted to individual sizes of about 30 mm in at least one downstream comminuting means 11 which is designed, for example, to be a slowly running cutting comminution means.

If a further comminution is required for the subsequent separating process, it is possible for a comminution to an individual size of about 10 mm to about 5 mm to be carried out in a further cutting mill, which then operates at a faster speed.

This mixed plastics material is then directed to a separating means 12, for example a gravimetric floatation separating means, which is set at a separating density of 1 g/cm$^3$. Because of the small difference in densities of the individual types of plastics material, it may be expedient in this regard when the gravimetric floatation separation process is carried out in a centrifugal field, for example in an appropriately designed solid bowl centrifuge. In the separating means 12, the polyolefin plastics materials are withdrawn as the floating matter 13. The deposited matter 14 then, in turn, contains the remaining plastics groups, in particular polycarbonate, polystyrene, polyethylene terephthalate and polyvinyl chloride, in the form of a mixed plastics material, and aluminium in the container 2 which is flushed out prior to settling.

Since the heavy matter separated in the container 2 as a rule has a high aluminium content, and since it is also possible for aluminium components to be contained in the remaining matter, as a result of a possible greater degree of comminution, it is expedient when not only the heavy matter withdrawn from the container 2, but also the remaining matter withdrawn after the separation 12, is passed via an eddy current-type separator 15, in which the aluminium and the content of any other nonmagnetic metals are separated off. It is then possible for the remaining residual matter to be disposed of or incinerated.

If it is intended to continue with the recycling of the residual matter discharged from the eddy current-type separator 15, it is expedient to separate the polyvinyl chloride plastics component contained in said residual matter, since the polyvinyl chloride component may have an adverse effect on the further processing of the remaining plastics materials collected. To this end, the remaining matter 16 discharged from the eddy current-type separator 15 is first loosened in a fluidized-bed conditioning step 17 and, subsequently, exposed in a free-fall separator 18 to an electrostatic field in which, when the selectivity is appropriately adjusted, it is possible for the polyvinyl chloride group to be withdrawn via the delivery means 19, together with a certain quantity of remaining plastics material. It is then possible for the remaining mixed plastics material, which then essentially comprises polycarbonates, polystyrenes and polyethylene terephthalates, to be directed toward further recycling as a plastics product.

In the event that a further breakdown is desirable in respect of this residual component of mixed plastics material, it is also possible to carry out a further division, for example, by means of a pneumatic table, into a light fraction, essentially containing polystyrene, and a heavy fraction containing the remaining matter.

In the event that the ferromagnetic components have already been removed from the charged matter by magnetic separation and, accordingly, the remaining plastics materials withdrawn from the separating means 6 practically contain only aluminium parts (if these have not already been separated off with the heavy matter), it is also possible for these aluminium parts to be removed prior to the separation 12. In this regard, use is made of the considerable difference in density between the aluminium and the plastics materials. Accordingly, it is possible for the separation to be carried out in a preceding gravimetric floatation separation, for example in the manner of a settling process 16, optionally assisted by upwardly flowing water. In so doing, it is then possible to dispense with the procedure whereby the deposited matter from the second gravimetric floatation separation 12 is admitted to the eddy current-type separator 15.

It is possible for the removal of the non-magnetizable metal parts from the remaining matter 14 to be carried out by means of a corona roller separator, instead of an eddy current-type separator.

Figure 2:
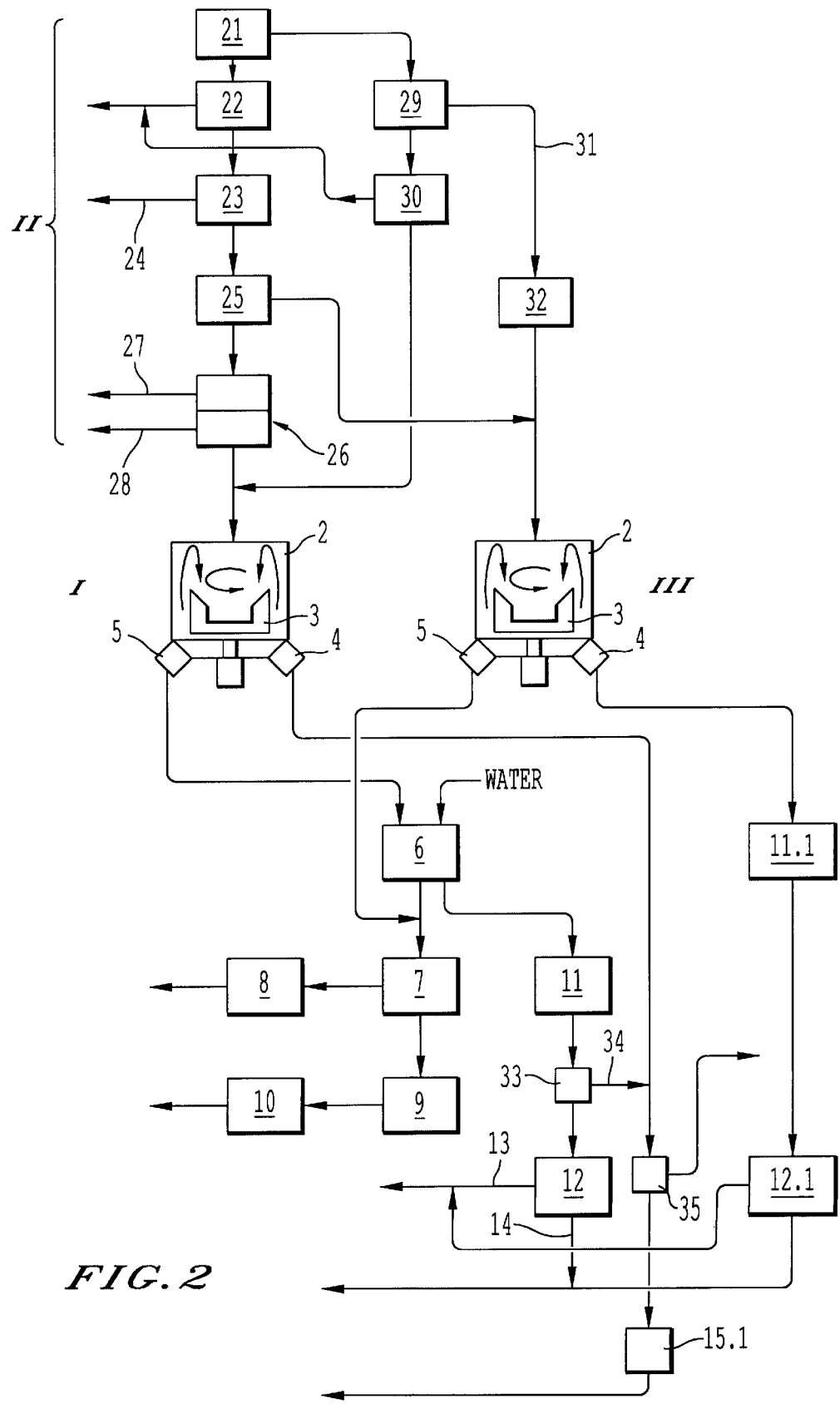
FIG. 2 shows the basic process including a preliminary processing stage.

FIG. 2 shows a flow chart of a variation of the basic process described above. The difference with respect to the process described with reference to FIG. 1 resides in that the socalled wet stage I is preceded by a dry preliminary preparation stage II. The waste matter, delivered in the form of a more or less dense bed, such as is collected, for example, behind a packing opener, which is not illustrated herein, is placed, for separation, on a first screen 21 which has a mesh width, for example, of 180 to 200 mm. The screenings, in the form of medium and fine matter, are admitted to a magnetic separator 22 in order to separate the ferromagnetic metals. Thereupon, the medium and fine matter is placed on a second screen 23 having a screening profile of up to 20 mm. The screenings 24 collected at this point and essentially comprising stones, sand, glass and organic matter, are withdrawn as matter for disposal. It is possible, although not necessary, for the heavy matter collected at this stage to be passed across a so-called auto-sort apparatus 26, by means of which it is possible, using optical processes via infrared measuring, to pick out automatically from the flow stream of waste matter, for example, beverage cartons as wastage 27, and special plastics materials, for example PET bottles, as wastage 28. The remaining residue is then directed to the wet stage I, where it is broken down according to the basic process as described with reference to FIG. 1.

The coarse matter separated off in the first screening stage 21 is directed to an air separation 29, in which light matter 30, essentially being large-sized plastic foils, are separated.

The heavy matter collected during the air separation 29 is optionally directed to a magnetic separator 31, for separating the coarse ferromagnetic component, and is subsequently admitted to the wet stage I.

Since the light matter 30 which is collected during the air separation 29 and essentially comprises foils, comprises only large-surfaced foils and/or large-surfaced composite materials of plastics material and board, it is sufficient for these to be pre-comminuted in a comminution step 32 and then to be admitted to a wet stage III which, as far as design and function are concerned, corresponds to the wet stage I.

The suspension, which is obtained in the wet stage III and essentially comprises fibre pulp, is directed to the fibre separating means 7, which forms part of the wet stage I, and is treated appropriately in the manner as described with reference to FIG. 1.

The solid component, which is obtained in the wet stage III and is also in the form of a mixed plastics material, is first precomminuted in a comminution step 11.1 and is then divided into at least two fractions in a separating means 12.1, in the manner described with reference to FIG. 1 for the corresponding process step of the wet stage I as described above.

As illustrated in FIG. 2, it is possible for the comminution means 11 of the wet stage I to be followed by a so-called heavy-matter trap 33 from which the heavy matter 34 is added to the heavy matter withdrawn via the discharge means 4 of the container 2, and is then directed via a further magnetic separator 35. As described with reference to FIG. 1, the overflow from the magnetic separator 35 is directed to an eddy current-type separator 15, by means of which it is then possible to separate the aluminium and any other non-magnetic metals possibly contained therein.

It is also possible for the corresponding allocation of the heavy-matter trap 33 and of the additional magnetic separator 35 to be provided in the basic process according to FIG. 1.

Likewise, it is also possible to include the preparation means described above with reference to FIG. 1 and connected downstream of the eddy current-type separator 15.

What is claimed is:

1. Process for the treatment of waste matter which contains components which are at least partially reusable, which components comprise mainly metals, plastics materials and board, which process comprises (1) agitating the waste matter to be treated in water in a container containing an agitator, with the application of mechanical force, whereby parts of the components comprising mainly plastics material, are coarsely reduced in size, and components, comprising mainly cardboard and paper board, form a suspension in the water, wherein the suspension contains fine solids and coarse solid matter of said components comprising mainly plastics material, cardboard and paper board, (2) mechanically separating metal components, as heavy matter, and remaining solids, from the suspension, (3) withdrawing the suspension containing said components comprising mainly plastics material, cardboard and paper board from said container, (4) separating the suspended fine solids from the suspension by draining, and (5) separating the coarse solid matter from the suspension.

2. Process according to claim 1, wherein after separation from the suspension, the coarse solid matter is rinsed with clean water.

3. Process according to claim 2, wherein the coarse solid matter is separated into at least two fractions according to their density in at least one gravimetric flotation separation process.

4. Process according to claim 3, wherein the gravimetric flotation separation process is adjusted such that polyolefin plastics materials are withdrawn as the floating matter.

5. Process according to claim 4, wherein the gravimetric flotation separation process is carried out in a centrifugal field.

6. Process according to claim 5, wherein the coarse solids are subjected to at least one further reduction in size prior to their admission to the gravimetric flotation separation process.

7. Process according to claim 6, wherein the fraction remaining after said gravimetric flotation separation process and metal components are exposed to an eddy current field, and, in doing so, nonmagnetic metal components mainly comprising aluminum, are separated off, leaving metal-free deposited matter of plastics materials.

8. Process according to claim 1, wherein the metal-free deposited matter is loosened up in a fluidized bed and, subsequently, PVC-components of said plastics materials are substantially separated off in an electrostatic free-fall separator leaving PVC-less deposited matter.

9. Process according to claim 8, wherein the PVC-less deposited matter is divided into at least two fractions in at least one density-based separation step.

10. Process according to claim 1, wherein the heavy matter separated out of the suspension is exposed to an eddy current field and, in doing so, non-magnetic metal components mainly comprising aluminium, are separated off.

11. Process according to claim 2, wherein after the separation of the coarse solids, a fibrous material component derived from said cardboard and paperboard is separated out of the suspension and is drained.

12. Process according to claim 1, wherein breakdown of the matter to be treated is carried out in batches by agitation in a water bath, the degree of breakdown being determined according to the duration of the agitation.

13. Process according to claim 12, wherein breakdown of the matter to be treated is carried out in batches by agitation in at least two successive water baths.

14. Process according to claim 1, wherein breakdown of the matter to be treated is carried out continuously in through-flow by agitation in water.

15. Process according claim 1, wherein prior to and/or after breaking down by the water, ferromagnetic components are removed from the matter to be treated by magnetic separation.

16. Process according to claim 1, wherein the matter to be treated is subjected to a dry preliminary processing step prior to its admission for breaking down by water.

17. Process according to claim 1, wherein the separation is carried out in at least one stage by screening and/or air separation and in that essentially only those parts which are to be broken down by water of the fractions obtained from the separation are introduced into the water.

* * * * *